United States Patent [19]

Edridge

[11] 4,161,510

[45] Jul. 17, 1979

[54] REFORMING FURNACE HAVING CERAMIC-COATED TUBES

[75] Inventor: Alfred J. Edridge, El Cerrito, Calif.

[73] Assignee: Chevron Research Company, San Francisco, Calif.

[21] Appl. No.: 641,791

[22] Filed: Dec. 18, 1975

Related U.S. Application Data

[60] Continuation-in-part of Ser. No. 537,503, Dec. 30, 1974, abandoned, which is a division of Ser. No. 391,081, Aug. 27, 1973, abandoned, which is a continuation of Ser. No. 240,856, Apr. 3, 1972, abandoned.

[51] Int. Cl.² ............................ B01J 8/06; F16L 9/14
[52] U.S. Cl. .................................. 422/197; 48/196 A; 138/146; 252/373; 422/204; 422/211; 422/240; 422/241; 428/36

[58] Field of Search .......... 23/288 M, 277 R, 277 US; 48/196 A, 94; 138/146; 428/36; 422/196, 197, 198, 200, 201, 202, 204, 211, 221, 240, 241

[56] References Cited

U.S. PATENT DOCUMENTS

| | | | |
|---|---|---|---|
| 3,412,063 | 11/1968 | Jarboe et al. | 260/37 |
| 3,607,125 | 9/1971 | Kydd | 23/288 M |

OTHER PUBLICATIONS

Perry, Chemical Engineers' Handbook, 4th Edit., pp. 23-64 through 23-66 (1963).

Primary Examiner—Joseph Scovronek
Attorney, Agent, or Firm—D. A. Newell; R. H. Davies

[57] ABSTRACT

The useful life of catalyst-filled tubes exposed to a heat source in a steam-light hydrocarbon reforming furnace is increased by painting at least a portion of the exposed surface of at least one tube with a liquid which forms a ceramic-like reflective surface on the tube.

1 Claim, No Drawings

4,161,510

REFORMING FURNACE HAVING CERAMIC-COATED TUBES

CROSS-REFERENCE TO RELATED APPLICATIONS

This application is a continuation-in-part of application Ser. No. 537,503, filed Dec. 30, 1974, now abandoned, which is a division of application Ser. No. 391,081, filed Aug. 27, 1973, now abandoned, which in turn is a continuation-in-part of application Ser. No. 240,856, filed Apr. 3, 1972, now abandoned.

BACKGROUND OF THE INVENTION

The present invention relates to apparatus used in steam-light hydrocarbon reforming, and particularly to tubes used in steam-light hydrocarbon reforming furnaces.

Hydrogen for use in ammonia synthesis, methanol synthesis or hydrocracking plants, is frequently produced in a process using the following reforming reaction:

$$2H_2O + CH_4 \xrightarrow{catalyst} 4H_2 + CO_2$$

The hydrocarbon can be methane as shown above, or other light hydrocarbons, including naphtha. The catalyst over which the reaction is carried out, e.g., nickel on an inert support, is contained in vertical tubes which are supported in a furnace frequently called a "reforming furnace". Reforming furnaces are schematically shown in the process flow diagrams of U.S. Pat. Nos. 3,264,066 and No. 3,382,044.

The tubes extend vertically in the reforming furnace with reactants being fed via a manifold to one end of the set of tubes and product-rich gases being withdrawn from the other end of the tubes. Because the reforming reaction occurs at a high temperature and is endothermic, heat must be supplied to the tubes to heat the reactants. The reaction is carried out in the tubes at a high temperature of about 1500° F. and a pressure of about 150 to 450 psig. Because of the elevated temperature and pressure, the tubes are under considerable stress. Because of this stress, it has been necessary to replace tubes frequently, as they have developed fissures or other imperfections or breaks. Replacement of tubes is expensive and sometimes causes or prolongs costly plant downtime.

SUMMARY OF THE INVENTION

According to the present invention, the useful life of catalyst-filled tubes exposed to a heat source in a steam-light hydrocarbon reforming furnace is increased by painting at least a portion of the exposed surface of at least one tube with a liquid which forms a ceramic-like surface on the tube.

In the past at least 15 years, tube failure due to fissures or the like has been a problem in reforming furnaces. When the problem became particularly acute in reforming furnaces with which I have been associated, the thought of painting the tubes with a ceramic-containing or ceramic-forming type paint at selective portions of the tube occurred to me. This idea was tried and found to be successful.

In particular, the ceramic painting was found to locally reduce tube wall temperature from about 1650°-1700° F. to about 1600°-1650° F. i.e., the temperature was reduced by about 20° F.-50° F. The locally reduced temperature locally reduces the fissure creep rate at painted critical portions of the tubes.

The use of the present invention is especially advantageous in furnaces in which the burners are located along a terraced wall pointing upward, and heat radiates from the burner to vertically extending tubes, such as those made by Kerr-McGee Company. The present invention is also useful in downfired furnaces, for example furnaces such as referred to in FIGS. 3 and 4 of U.S. Pat. No. 3,132,010, assigned to M. W. Kellogg Company.

PREFERRED EMBODIMENT

Preferred ceramic-like materials for painting the catalyst tubes are as described in U.S. Pat. No. 3,412,063, which discloses liquid coating compositions that can be air-cured or heat-cured, using a silicate base typified by tetraethyl orthosilicate and aluminum oxide to provide a hard, infusible coating for various types of substrata. Titanium dioxide may be added for improved results, together with trimethyl borate or tetrabutyl titanate as reaction accelerators and various suspension agents to provide a one-package liquid composition providing a hard, infusible and fast-curing coating with high dielectric strength and a high degree of inflammability. The disclosure of U.S. Pat. No. 3,412,063 is incorporated herein by reference thereto. The coatings described in the patent have a high temperature and falmmability resistance. These coatings, typically containing tetraethyl orthosilicate and aluminum oxide, are preferred for use in the present invention to provide a ceramic-like heat-reflective surface. The ceramic-like heat-reflective surface is a surface which will withstand temperatures above 1500° F. without disintegrating and without losing adherence to the metal tube on which the ceramic-like material is coated.

I have found that particularly good results are obtained using Ceram-ite 100, which is obtainable from Plas-Chem Corporation, St. Louis, Missouri, and is described in Plas-Chem's Bulletin No. 6.09.06, which Bulletin makes reference to U.S. Pat. No. 3,412,063. Thus, Ceram-ite 100 comprises a silicate base, particularly an alkyl silicate typified by tetraethyl orthosilicate, and an aluminum oxide.

The ceramic-like reflective coating can be applied to reforming tubes by various methods, such as brushing, wiping or spraying. In particular, I have obtained good results by brushing the ceramic-like reflective material on the tubes.

The ceramic-like reflective material is most advantageously used on portions of the tube exposed to very high temperatures, e.g., 1500°-2000° F., and especially 1500°-1800° F. The term "exposed to high temperature" as used herein means the temperature at the exposed tube surface, or within a few inches of the exposed tube surface. Usually the portions of the tubes exposed to the highest temperature are those parts nearest to a burner, e.g., the 2–6 feet (usually 2–20% of the length of the tube) closest to a given burner.

What is claimed is:

1. Apparatus for steam reforming of light hydrocarbons which comprises in combination:
   a steam reforming furnace including tubes filled with steam reforming catalyst; and
   a coating of ceramic, heat reflective material painted on the outer surface of at least a portion of at least one of said tubes exposed to high temperatures during steam reforming, whereby the fissure creep rate in said portion of said tubes is reduced.

* * * * *